US007689406B2

(12) United States Patent
Beerends

(10) Patent No.: US 7,689,406 B2
(45) Date of Patent: Mar. 30, 2010

(54) METHOD AND SYSTEM FOR MEASURING A SYSTEM'S TRANSMISSION QUALITY

(75) Inventor: John Gerard Beerends, Hengstdijk (NL)

(73) Assignee: Koninklijke KPN. N.V., The Hague (NL)

( * ) Notice: Subject to any disclaimer, the term of this patent is extended or adjusted under 35 U.S.C. 154(b) by 1147 days.

(21) Appl. No.: 10/504,619

(22) PCT Filed: Feb. 26, 2003

(86) PCT No.: PCT/EP03/02058

§ 371 (c)(1), (2), (4) Date: Aug. 13, 2004

(87) PCT Pub. No.: WO03/076889

PCT Pub. Date: Sep. 18, 2003

(65) Prior Publication Data

US 2005/0159944 A1 Jul. 21, 2005

(30) Foreign Application Priority Data

Mar. 8, 2002 (EP) .................................. 02075973
Mar. 11, 2002 (EP) .................................. 02075997

(51) Int. Cl.
*G06F 17/28* (2006.01)

(52) U.S. Cl. ......................... 704/3; 704/200.1; 704/228; 704/233; 704/500; 375/147; 714/714; 455/110

(58) Field of Classification Search .............. 704/200.1, 704/228, 233, 500; 375/147; 714/714; 455/110
See application file for complete search history.

(56) References Cited

U.S. PATENT DOCUMENTS 4,110,692 A * 8/1978 Pradal ......................... 455/110
4,352,182 A * 9/1982 Billi et al. ................... 714/714

(Continued)

OTHER PUBLICATIONS

J.G. Beerends et al, "Perceptual Evaluation of Speech Quality (PESQ), the New ITU Standard for End-To-End Speech Quality Assessment. Part II—Psychoacoustic Model", www.psytechnics.com/papers/, Jun. 2001, pp. 1-27, XP 002206026.

(Continued)

*Primary Examiner*—Richemond Dorvil
*Assistant Examiner*—Michael C Colucci
(74) *Attorney, Agent, or Firm*—Michaelson & Associates; Peter L. Michaelson

(57) ABSTRACT

Method and system for measuring transmission quality of an audio transmission system under test. Specifically, an input signal (X), such as an original input speech signal, is applied to the audio transmission system which results in an output signal (Y) produced by the transmission system. Both signals X and Y are mutually processed to yield a perceived quality signal. In accordance with the invention, output signal Y and/or input signal X are scaled such that, depending on a ratio of power of these two signals, relatively small deviations of power between these signals are compensated, while relatively larger deviations are only partially compensated. Further, an artificial reference speech signal may be created for which noise levels present in the input speech signal are reduced by a scale factor which reflects a local level of the noise in that input signal.

8 Claims, 4 Drawing Sheets

U.S. PATENT DOCUMENTS

| | | | | |
|---|---|---|---|---|
| 4,578,818 | A * | 3/1986 | Claydon | 455/110 |
| 5,621,854 | A * | 4/1997 | Hollier | 704/200.1 |
| 5,672,999 | A * | 9/1997 | Ferrer et al. | 330/138 |
| 5,749,067 | A * | 5/1998 | Barrett | 704/233 |
| 5,799,133 | A * | 8/1998 | Hollier et al. | 704/200.1 |
| 5,940,792 | A * | 8/1999 | Hollier | 704/228 |
| 5,949,790 | A * | 9/1999 | Pehkonen et al. | 370/465 |
| 5,999,900 | A * | 12/1999 | Hollier | 704/228 |
| 6,035,270 | A * | 3/2000 | Hollier et al. | 704/202 |
| 6,041,294 | A * | 3/2000 | Beerends | 704/203 |
| 6,389,111 | B1 * | 5/2002 | Hollier et al. | 379/28 |
| 2002/0015438 | A1 * | 2/2002 | Ishizu et al. | 375/147 |
| 2002/0095297 | A1 * | 7/2002 | Hasegawa | 704/500 |
| 2003/0115050 | A1 * | 6/2003 | Chen et al. | 704/230 |

OTHER PUBLICATIONS

A.W. Rix et al, "Perceptual Evaluation of Speech Quality (PESQ)—A New Method for Speech Quality Assessment of Telephone Networks and Codecs", 2001 IEEE International Conference on Acoustics, Speech, and Signal Processing Proceedings, vol. 1, May 7-11, 2001, pp. 749-752, XP 002187839.

J. Anderson, Methods for Measuring Perceptual Speech Quality, Agilent Technologies, Mar. 1, 2001, pp. 1-34, XP 002172414.

A.W. Rix et al, "Perceptual Evaluation of Speech Quality (PESQ), the New ITU Standard for End-To-End Speech Quality Assessment. Part I—Time Alignment", www.psytechnics.com/papers/, Jun. 2001, pp. 1-9, XP 002206027.

* cited by examiner

METHOD AND SYSTEM FOR MEASURING A SYSTEM'S TRANSMISSION QUALITY

FIELD OF THE INVENTION

The invention refers to a method and a system for measuring the transmission quality of a system under test, an input signal entered into the system under test and an output signal resulting from the system under test being processed and mutually compared.

BACKGROUND OF THE INVENTION

Draft ITU-T recommendation P.862, "Telephone transmission quality, telephone installations, local line networks—Methods for objective and subjective assessment of quality—Perceptual evaluation of speech quality (PESQ) [see reference 8], an objective method for end-to-end speech quality assessment of narrow-bank telephone networks and speech codecs", ITU-T 02.2001, discloses prior art PESQ methods and systems.

Measuring the quality of audio signals, degraded in audio processing or transmission systems, may have poor results for very weak or silent portions in the input signal. The methods and systems known from Recommendation P.862 have the disadvantage that they do not compensate for differences in power level on a frame by frame basis correctly. These differences are caused by gain variations or noise in the input signal. The incorrect compensation leads to low correlations between subjective and objective scores, especially when the original reference input speech signal contains low levels of noise.

According to a prior art method and system, disclosed in applicant's EP01200945, improvements are achieved by applying a first scaling step in a pre-processing stage with a first scaling factor which is a function of the reciprocal value of the power of the output signal increased by an adjustment value. A second scaling step is applied with a second scaling factor which is substantially equal to the first scaling factor raised to an exponent having a adjustment value between zero and one. The second scaling step may be carried out on various locations in the device, while the adjustment values are adjusted using test signals with well defined subjective quality scores.

Both, in the methods and systems of Recommendation P.862 and EP01200945 the degraded output signal is scaled locally to match the reference input signal in the power domain.

It has been found that the results of the (perceptual) quality measurement process can be improved by application of "soft-scaling" at least one stage of the method and system respectively.

Introduction of "soft-scaling" instead of "hard scaling" (using "hard" scaling thresholds) is based on the observation and understanding that—the field of the invention relates assessment of audio quality as experienced by human users—human audio perception mechanisms rather use "soft thresholds" than "hard thresholds". Based on that observation and a better understanding of how those human audio scaling mechanism works, the present invention presents such "soft-scaling" mechanisms, to be added to or inserted into the prior art method or system respectively.

SUMMARY OF THE INVENTION

According to an aspect of the invention the output signal and/or the input signal of a system are scaled, in a way that small deviations of the power are compensated, while larger deviations are compensated partially in a manner that is dependent on the power ratio.

According to a further elaboration of the invention an artificial reference speech signal may be created, for which the noise levels as present in the original input speech signal are lowered by a scaling factor that depends on the local level of the noise in this input.

The result of the inventive measures is a more correct prediction of the subjectively perceived end-to-end speech quality for speech signals which contain variations in the local scaling, especially in the case where soft speech parts and silences are degraded by low levels of noise.

In the soft-scaling algorithm, two different types of signal processing are used to improve the correlation between subjectively perceived quality and objectively measured quality.

In the first soft-scale processing, controlled by a first sub-algorithm, the compensation used in Recommendation P.862 to correct for local gain changes in the output signal, is improved by scaling the output (or the input) in such way that small deviations of the power are compensated (preferably per time frame or period) while larger deviations are compensated partially, dependent on the power ratio.

A preferred simple and effective implementation takes the local powers, i.e., the power in each frame (of, e.g., 30 ms.) and calculates a local compensation ratio F:

$$F=(PX+\Delta)/(PY+\Delta)^{*})$$

which F is amplitude clipped at levels mm and MM to get a clipped ratio C:

$$C=mm \text{ whenever } F<mm\leqq 1.0$$

and $$C=MM \text{ whenever } F>MM\geqq 1.0$$

while otherwise $$C=F$$

*) "Δ" is used to optimize the value of C for small values of PY.

The clipped ratio C is then used to calculate a soft-scale ratio S by using factors m and M, with mm<m≦1.0 and MM>M≧1.0:

$$S=C^{a}+C-C(m)^{a-1} \text{ whenever } C<m \text{ with } 0.5<a<1.0$$

and $$S=C^{a}+C-C(M)^{a-1} \text{ whenever } C>M \text{ with } 0.5<a<1.0$$

while otherwise $$S=C$$

"a" may be used as a (first) tuning parameter.

In this way the local scaling in the present invention is equivalent to the scaling as given in the prior art documents Recommendation P.862 and EP01200945 as long as m≦F≦M. However for values F<m or F>M the scaling is progressively deviating less from 1.0 then the scaling as given in the prior art. The soft-scale factor S is used in the same way F is used in the prior art methods and systems to compensate the output power in each frame locally.

In the second soft-scale processing, controlled by a second sub-algorithm, the compensation used is focused on low level parts of the input signal.

When the input signal (reference signal) contains low levels of noise, a transparent speech transport system will give an output speech signal that also contains low levels of noise. The output of the speech transport system is then judged of having lower quality than expected on the basis of the noise introduced by the transport system. One would only be aware of the fact that the noise is not caused by the transport system if one could listen to the input speech signal and make a comparison. However in most subjective speech quality tests, the input reference is not presented to the testing subject and consequently the subject judges low noise level differences in the input signal as differences in quality of the speech transport system. In order to have high correlations, in objective test systems, with such subjective tests, this effect has to be emulated in an advanced objective speech quality assessment algorithm.

The present preferred option of the invention emulates this by effectively creating a new, virtual, artificial reference speech signal in the power representation domain for which the noise power levels are lowered by a scaling factor that depends on the local level of the noise in the input signal. Thus the newly created artificial reference signal converges to zero faster than the original input signal for low levels of this input signal. When the disturbances in the degraded output signal are calculated during low level signal parts, as present in the reference input signal, the difference calculation in the internal representation loudness domain is carried out after scaling of the input loudness signal to a level that goes to zero faster than the loudness of the input signal as it approaches zero.

According to the prior art method disclosed in EP01200945, the processing implies mapping of the (degraded) output signal (Y(t)) and the reference signal (X(t)) on representation signals LY and LX according to a psycho-physical perception model of the human auditory system. A differential or disturbance signal (D) is determined by “differentiating means” from those representation signals, which disturbance signal is then processed by modeling means in accordance with a cognitive model, in which certain properties of human testees have been modeled, in order to obtain the quality signal Q.

As said above, the difference calculation in the internal representation loudness domain is, within the scope of the present invention, preferably carried out after scaling the input loudness signal to a level that goes to zero faster than the loudness of the input signal as it approaches zero.

An effective implementation of this is achieved by using the difference in internal representation in the time-frequency plane calculated from $LX(f)_n$ and $LY(f)_n$—see EP01200945—as $$D(f)_n = |LY(f)_n - LX(f)_n|$$

and replacing this by:

$$D(f)_n = |LY(f)_n - H(t,f)|$$

with $$H(t,f) = LX(f)_n^{\,b}/K^{b-1} \text{ for all } LX(f)_n < K$$

and $$H(t,f) = LX(f)_n \text{ for all } LX(f)_n \geqq K$$

In these formula is b>1 while K represents the low level noise power criterion per time frequency cell, dependent on the specific implementation.

This second soft-scale processing sub-algorithm can also be implemented by replacing the $LX(f)_n < K$ criterion by a power criterion in a single time frame, i.e.:

$$D(f)_n = |LY(f)_n - H(t,f)|$$

with $$H(t,f) = LX(f)_n^{\,b}/K^{b-1} \text{ for all } LX(t) < K'$$

and $$H(t,f) = LX(f)_n \text{ for all } LX(t) \geqq K'$$

In these formula is b>1 while K' represents the low level noise power criterion per time frame which is dependent on the specific implementation.

DETAILED DESCRIPTION OF THE DRAWINGS

Figure 1:
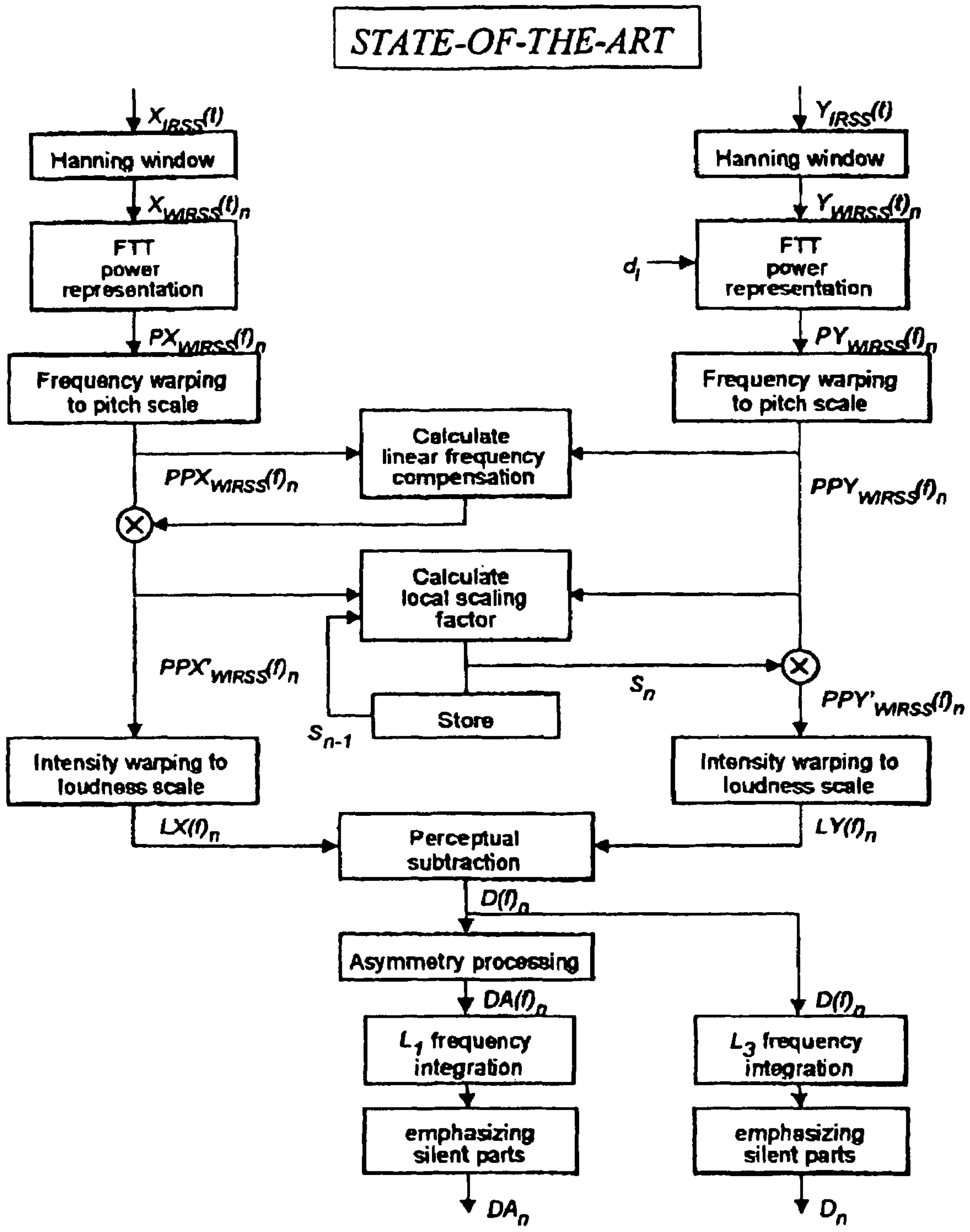
FIG. 1 shows schematically a prior art PESQ system, disclosed in ITU-T recommendation P.862.

The PESQ system shown in FIG. 1 compares an original signal (input signal) X(t) with a degraded signal (output signal) Y(t) that is the result of passing X(t) through, e.g., a communication system. The output of the PESQ system is a prediction of the perceived quality that would be given to Y(t) by subjects in a subjective listening test.

In the first step executed by the PESQ system a series of delays between original input and degraded output are computed, one for each time interval for which the delay is significantly different from the previous time interval. For each of these intervals a corresponding start and stop point is calculated. The alignment algorithm is based on the principle of comparing the confidence of having two delays in a certain time interval with the confidence of having a single delay for that interval. The algorithm can handle delay changes both during silences and during active speech parts.

Based on the set of delays that are found, the PESQ system compares the original (input) signal with the aligned degraded output of the device under test using a perceptual model. The key to this process is transformation of both the original and the degraded signals to internal representations (LX, LY), analogous to the psychophysical representation of audio signals in the human auditory system, taking account of perceptual frequency (Bark) and loudness (Sone). This is achieved in several stages: time alignment, level alignment to a calibrated listening level, time-frequency mapping, frequency warping, and compressive loudness scaling.

The internal representation is processed to take account of effects such as local gain variations and linear filtering that may—if they are not too severe—have little perceptual significance. This is achieved by limiting the amount of compensation and making the compensation lag behind the effect. Thus minor, steady-state differences between corresponding original and degraded speech signals are compensated. More severe effects, or rapid variations, are only partially compensated so that a residual effect remains and contributes to the overall perceptual disturbance. This allows a small number of quality indicators to be used to model all subjective effects. In the PESQ system, two error parameters are computed in the cognitive model; these are combined to give an objective listening quality MOS (Mean Opinion Score). The basic ideas used in the PESQ system are described in the bibliography references [1] to [5].

The Perceptual Model in the Prior Art PESQ System

The perceptual model of a PESQ system, shown in FIG. 1, is used to calculate a distance between the original and degraded speech signal ("PESQ score"). This may be passed through a monotonic function to obtain a prediction of a subjective MOS for a given subjective test. The PESQ score is mapped to a MOS-like scale, a single number in the range of −0.5 to 4.5, although for most cases the output range will be between 1.0 and 4.5, the normal range of MOS values found in an ACR listening quality experiment.

Precomputation of Constant Settings

Certain constant values and functions are pre-computed. For those that depend on the sample frequency, versions for both 8 and 16 kHz sample frequency are stored in the program.

FFT Window Size and Sample Frequency

In the PESQ system the time signals are mapped to the time frequency domain using a short term FFT (Fast Fourier Transformation) with a Hann window of size 32 ms. For 8 kHz this amounts to 256 samples per window and for 16 kHz the window counts 512 samples while adjacent frames are overlapped by 50%.

Absolute Hearing Threshold

The absolute hearing threshold $P_0(f)$ is interpolated to get the values at the center of the Bark bands that are used. These values are stored in an array and are used in Zwicker's loudness formula.

The Power Scaling Factor

There is an arbitrary gain constant following the FFT for time-frequency analysis. This constant is computed from a sine wave of a frequency of 1 000 Hz with an amplitude at 29.54 (40 dB SPL) transformed to the frequency domain using the windowed FFT over 32 ms. The (discrete) frequency axis is then converted to a modified Bark scale by binning of FFT bands. The peak amplitude of the spectrum binned to the Bark frequency scale (called the "pitch power density") must then be 10 000 (40 dB SPL). The latter is enforced by a postmultiplication with a constant, the power scaling factor $S_p$.

The Loudness Scaling Factor

The same 40 dB SPL reference tone is used to calibrate the psychoacoustic (Sone) loudness scale. After binning to the modified Bark scale, the intensity axis is warped to a loudness scale using Zwicker's law, based on the absolute hearing threshold. The integral of the loudness density over the Bark frequency scale, using a calibration tone at 1 000 Hz and 40 dB SPL, must then yield a value of 1 Sone. The latter is enforced by a postmultiplication with a constant, the loudness scaling factor S.

IRS-Receive Filtering

As stated in section 10.1.2 of Draft ITU recommendation P.8672 [reference 8], it is assumed that the listening tests were carried out using an IRS receive or a modified IRS receive characteristic in the handset. The necessary filtering to the speech signals is already applied in the pre-processing.

Computation of the Active Speech Time Interval

If the original and degraded speech file start or end with large silent intervals, this could influence the computation of certain average distortion values over the files. Therefore, an estimate is made of the silent parts at the beginning and end of these files. The sum of five successive absolute sample values must exceed 500 from the beginning and end of the original speech file in order for that position to be considered as the start or end of the active interval. The interval between this start and end is defined as the active speech time interval. In order to save computation cycles and/or storage size, some computations can be restricted to the active interval.

Short Term FFT

The human ear performs a time-frequency transformation. In the PESQ system this is implemented by a short term FFT with a window size of 32 ms. The overlap between successive time windows (frames) is 50 percent. The power spectra—the sum of the squared real and squared imaginary parts of the complex FFT components—are stored in separate real valued arrays for the original and degraded signals. Phase information within a single Hann window is discarded in the PESQ system and all calculations are based on only the power representations $PX_{WIRSS}(f)_n$ and $PY_{WIRSS}(f)_n$. The start points of the windows in the degraded signal are shifted over the delay. The time axis of the original speech signal is left as is. If the delay increases, parts of the degraded signal are omitted from the processing, while for decreases in the delay parts are repeated.

Calculation of the Pitch Power Densities

The Bark scale reflects that at low frequencies, the human hearing system has a finer frequency resolution than at high frequencies. This is implemented by binning FFT bands and summing the corresponding powers of the FFT bands with a normalization of the summed parts. The warping function that maps the frequency scale in Hertz to the pitch scale in Bark does not exactly follow the values given in the literature. The resulting signals are known as the pitch power densities $PPX_{WIRSS}(f)_n$ and $PPY_{WIRSS}(f)_n$.

Partial Compensation of the Original Pitch Power Density

To deal with filtering in the system under test, the power spectrum of the original and degraded pitch power densities are averaged over time. This average is calculated over speech active frames only using time-frequency cells whose power is more than 1 000 times the absolute hearing threshold. Per modified Bark bin, a partial compensation factor is calculated from the ratio of the degraded spectrum to the original spectrum. The maximum compensation is never more than 20 dB. The original pitch power density $PPX_{WIRSS}(f)_n$ of each frame n is then multiplied with this partial compensation factor to equalize the original to the degraded signal. This results in an inversely filtered original pitch power density $PPX'_{WIRSS}(f)_n$. This partial compensation is used because severe filtering can be disturbing to the listener. The compensation is carried out on the original signal because the degraded signal is the one that is judged by the subjects in an ACR experiment.

Partial Compensation of the Distorted Pitch Power Density

Short-term gain variations are partially compensated by processing the pitch power densities frame by frame. For the original and the degraded pitch power densities, the sum in each frame n of all values that exceed the absolute hearing threshold is computed. The ratio of the power in the original and the degraded files is calculated and bounded to the range $[3 \cdot 10^{-4}, 5]$. A first order low pass filter (along the time axis) is applied to this ratio. The distorted pitch power density in each frame, n, is then multiplied by this ratio, resulting in the partially gain compensated distorted pitch power density $PPY'_{WIRSS}(f)_n$.

Calculation of the Loudness Densities

After partial compensation for filtering and short-term gain variations, the original and degraded pitch power densities are transformed to a Sone loudness scale using Zwicker's law [7].

$$LX(f)_n = S_l \cdot \left(\frac{P_0(f)}{0.5}\right)^{\gamma} \cdot \left[\left(0.5 + 0.5 \cdot \frac{PPX'_{WIRSS}(f)_n}{P_0(f)}\right)^{\gamma} - 1\right]$$

with $P_0(f)$ the absolute threshold and $S_1$ the loudness scaling factor.

Above 4 Bark, the Zwicker power, γ, is 0.23, the value given in the literature. Below 4 Bark, the Zwicker power is increased slightly to account for the so-called recruitment effect. The resulting two-dimensional arrays $LX(f)_n$ and $LY(f)_n$ are called loudness densities.

Calculation of the Disturbance Density

The signed difference between the distorted and original loudness density is computed. When this difference is positive, components such as noise have been added. When this difference is negative, components have been omitted from the original signal. This difference array is called the raw disturbance density.

The minimum of the original and degraded loudness density is computed for each time frequency cell. These minima are multiplied by 0.25. The corresponding two-dimensional array is called the mask array. The following rules are applied in each time-frequency cell:

If the raw disturbance density is positive and larger than the mask value, the mask value is subtracted from the raw disturbance.

If the raw disturbance density lies in between plus and minus the magnitude of the mask value the disturbance density is set to zero.

If the raw disturbance density is more negative than minus the mask value, the mask value is added to the raw disturbance density.

The net effect is that the raw disturbance densities are pulled towards zero. This represents a dead zone before an actual time frequency cell is perceived as distorted. This models the process of small differences being inaudible in the presence of loud signals (masking) in each time-frequency cell. The result is a disturbance density as a function of time (window number n) and frequency, $D(f)_n$.

Cell-Wise Multiplication with an Asymmetry Factor

The asymmetry effect is caused by the fact that when a codec distorts the input signal it will in general be very difficult to introduce a new time-frequency component that integrates with the input signal, and the resulting output signal will thus be decomposed into two different percepts, the input signal and the distortion, leading to clearly audible distortion [2]. When the codec leaves out a time-frequency component the resulting output signal cannot be decomposed in the same way and the distortion is less objectionable. This effect is modeled by calculating an asymmetrical disturbance density $DA(f)_n$ per frame by multiplication of the disturbance density $D(f)_n$ with an asymmetry factor. This asymmetry factor equals the ratio of the distorted and original pitch power densities raised to the power of 1.2. If the asymmetry factor is less than 3 it is set to zero. If it exceeds 12 it is clipped at that value. Thus only those time frequency cells remain, as non-zero values, for which the degraded pitch power density exceeded the original pitch power density.

Aggregation of the Disturbance Densities

The disturbance density $D(f)_n$ and asymmetrical disturbance density $DA(f)_n$ are integrated (summed) along the frequency axis using two different Lp norms and a weighting on soft frames (having low loudness):

$$D_n = M_n \sqrt[3]{\sum_{f=1,\ldots\ \text{Number of Barkbands}} (|D(f)_n|W_f)^3}$$

$$DA_n = M_n \sum_{f=1,\ldots\ \text{Number of Barkbands}} (|DA(f)_n|W_f)$$

with $M_n$ a multiplication factor, 1/(power of original frame plus a constant)$^{0.04}$, resulting in an emphasis of the disturbances that occur during silences in the original speech fragment, and $W_f$ a series of constants proportional to the width of the modified Bark bins. After this multiplication the frame disturbance values are limited to a maximum of 45. These aggregated values, $D_n$ and $DA_n$, are called frame disturbances.

Zeroing of the Frame Disturbance

If the distorted signal contains a decrease in the delay larger than 16 ms (half a window) the repeat strategy as mentioned in 10.2.4 of Draft ITU recommendation P.862 [reference 8] is modified. It was found to be better to ignore the frame disturbances during such events in the computation of the objective speech quality. As a consequence frame disturbances are zeroed when this occurs. The resulting frame disturbances are called $D'_n$ and $DA'_n$.

Realignment of Bad Intervals

Consecutive frames with a frame disturbance above a threshold are called bad intervals. In a minority of cases the objective measure predicts large distortions over a minimum number of bad frames due to incorrect time delays observed by the preprocessing. For those so-called bad intervals a new delay value is estimated by maximizing the cross correlation between the absolute original signal and absolute degraded signal adjusted according to the delays observed by the preprocessing. When the maximal cross correlation is below a threshold, it is concluded that the interval is matching noise against noise and the interval is no longer called bad, and the processing for that interval is halted. Otherwise, the frame disturbance for the frames during the bad intervals is recomputed and, if it is smaller, it replaces the original frame disturbance. The result is the final frame disturbances $D''_n$ and $DA''_n$ that are used to calculate the perceived quality.

Aggregation of the Disturbance within Split Second Intervals

Next, the frame disturbance values and the asymmetrical frame disturbance values are aggregated over split second intervals of 20 frames (accounting for the overlap of frames: approx. 320 ms) using $L_6$ norms, a higher p value as in the aggregation over the speech file length. These intervals also overlap 50 percent and no window function is used.

Aggregation of the Disturbance Over the Duration of the Signal

The split second disturbance values and the asymmetrical split second disturbance values are aggregated over the active interval of the speech files (the corresponding frames)$_n$ow using $L_2$ norms. The higher value of p for the aggregation within split second intervals as compared to the lower p value of the aggregation over the speech file is due to the fact that when parts of the split seconds are distorted that split second loses meaning, whereas if a first sentence in a speech file is distorted the quality of other sentences remains intact.

Computation of the PESQ Score

The final PESQ score is a linear combination of the average disturbance value and the average asymmetrical disturbance value. The range of the PESQ score is −0.5 to 4.5, although for most cases the output range will be a listening quality MOS-like score between 1.0 and 4.5, the normal range of MOS values found in an ACR (Absolute Category Rating) experiment.

Figure 2:
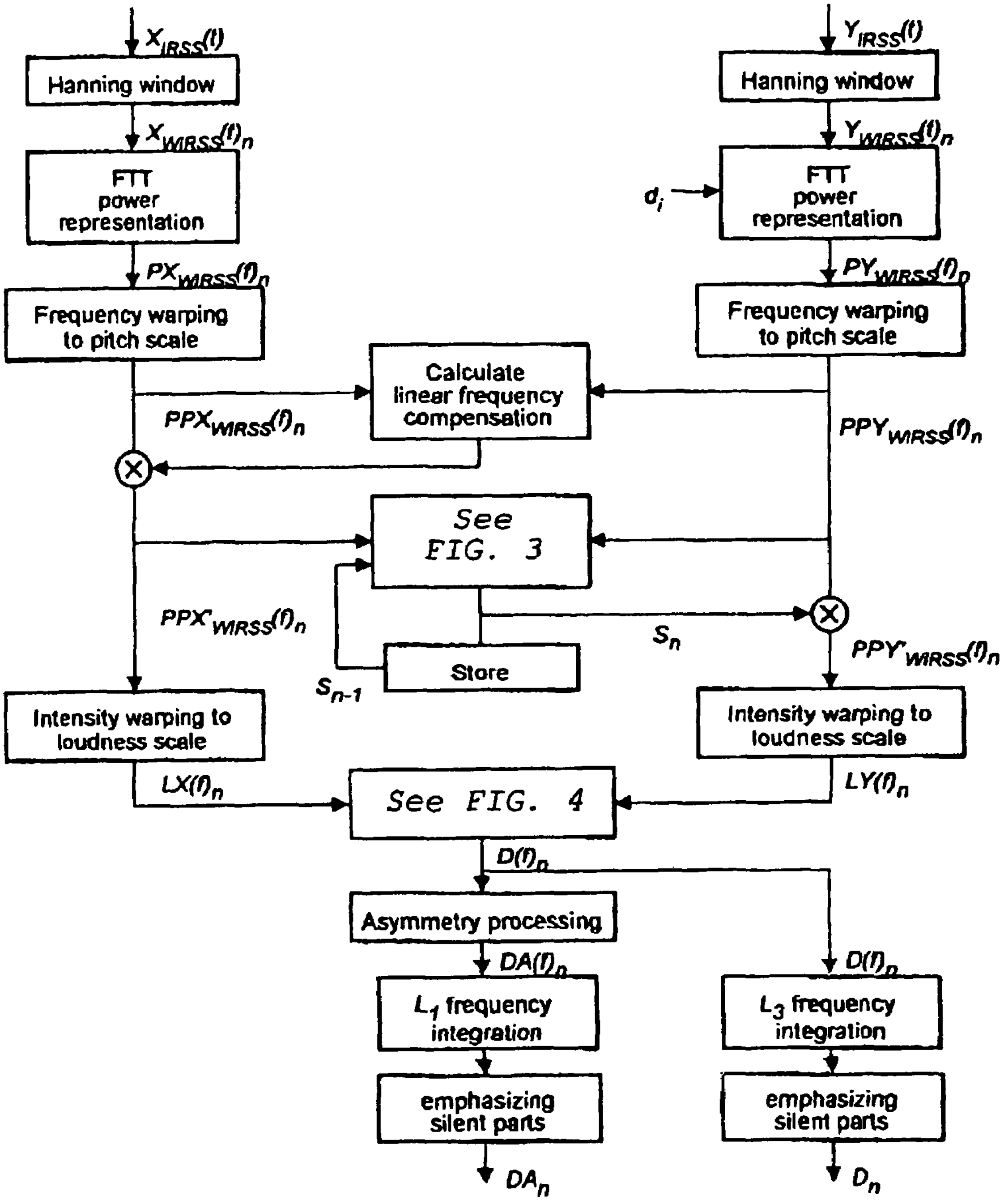
FIG. 2 shows the same PESQ system which, however, is modified to be fit for executing the method as presented above by the use of a first and, preferably, a second new module.

FIG. 2 is equal to FIG. 1, with the exception of a first new module, replacing the prior art module for calculating the local scaling factor and a new second module, replacing the prior art module for perceptual subtraction.

The first new module is fit for execution of the method according to the invention, comprising means for scaling the output signal and/or the input signal of the system under test, under control of a new, "soft-scaling" algorithm, compensating small deviations of the power, while compensating larger deviations partially, dependent on the power ratio. The first module is depicted in FIG. 3.

The second new module is fit for execution of a further elaboration of the invention, comprising means for the creation of an artificial reference speech signal, for which the noise levels as present in the original input speech signal are lowered by a scaling factor that depends on the local level of the noise in this input.

The operation of both new modules are depicted in the form of flow diagrams, representing the operation of the respective modules. Both modules may be implemented in hardware or in software.

Figure 3:
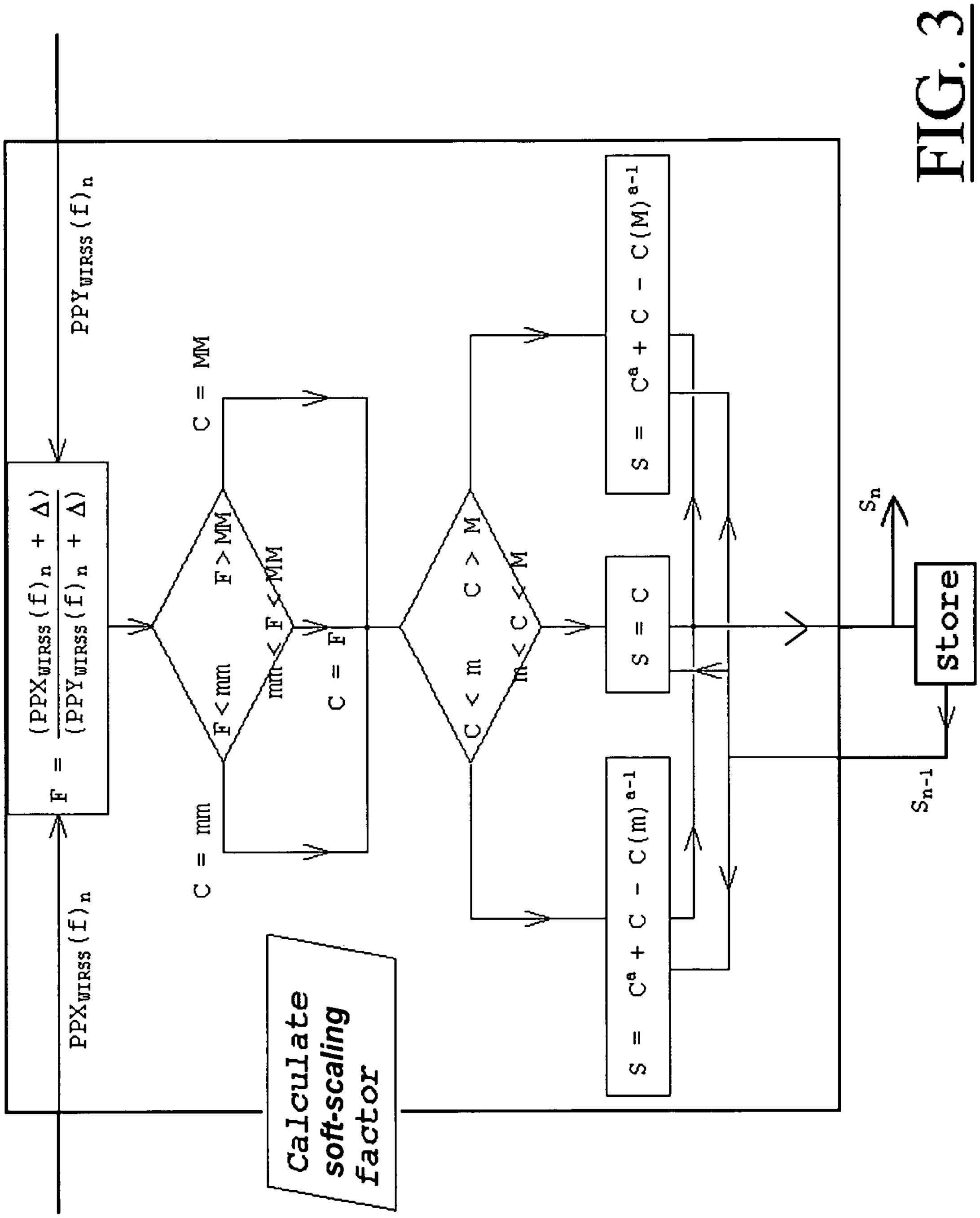
FIG. 3 shows the first new module of the PESQ system.

FIG. 3 depicts the operation of the first new module shown in FIG. 2. The operation of the module in FIG. 3 is controlled by the first sub-algorithm as represented by the depicted flow diagram, improving the compensation function to correct for local gain changes in the output signal, by scaling the output and/or input signals in such way that small deviations of the power are compensated, preferably per time frame or period, while larger deviations are compensated partially, dependent on the power ratio. The preferred simple and effective implementation of the invention takes the local powers, i.e., the power in each frame (of, e.g., 30 ms.) and calculates a local compensation ratio $F=(PX+\Delta)/(PY+\Delta)$.

Note: PX and PY are the shorter notations of $PPX_{WIRSS}(f)_n$ and $PPY_{WIRSS}(f)_n$ respectively as used in the FIGS. 1, 2 and 3.

F is amplitude clipped at levels mm and MM to get a clipped ratio $C=mm$ for $F<mm\leqq 1.0$ or $C=MM$ for $F>MM\geqq 1.0$ or $C=F$ "Δ" for optimizing C for small values of PX and/or PY).

The clipped ratio C is used to calculate a soft-scale ratio S by using factors m and M, with $mm<m\leqq 1.0$ and $MM>M\geqq 1.0$.

Soft-scale ratio $S=C^a+C-C(m)^{a-1}$ for $C<m$ $(0.5<a<1.0)$ or $S=C^a+C-C\,(M)^{a-1}$ for $C>M$ or $S=C$ In this way the local scaling in the present invention is equivalent to the scaling as given in the prior art documents Recommendation P.862 and EP01200945 as long as $m\leqq F\leqq M$. However for values $F<m$ or $F>M$ the scaling is progressively deviating less from 1.0 than the scaling as given in the prior art. The soft-scale factor S is used in the same way F is used in the prior art methods and systems to compensate the output power in each frame locally.

Figure 4:
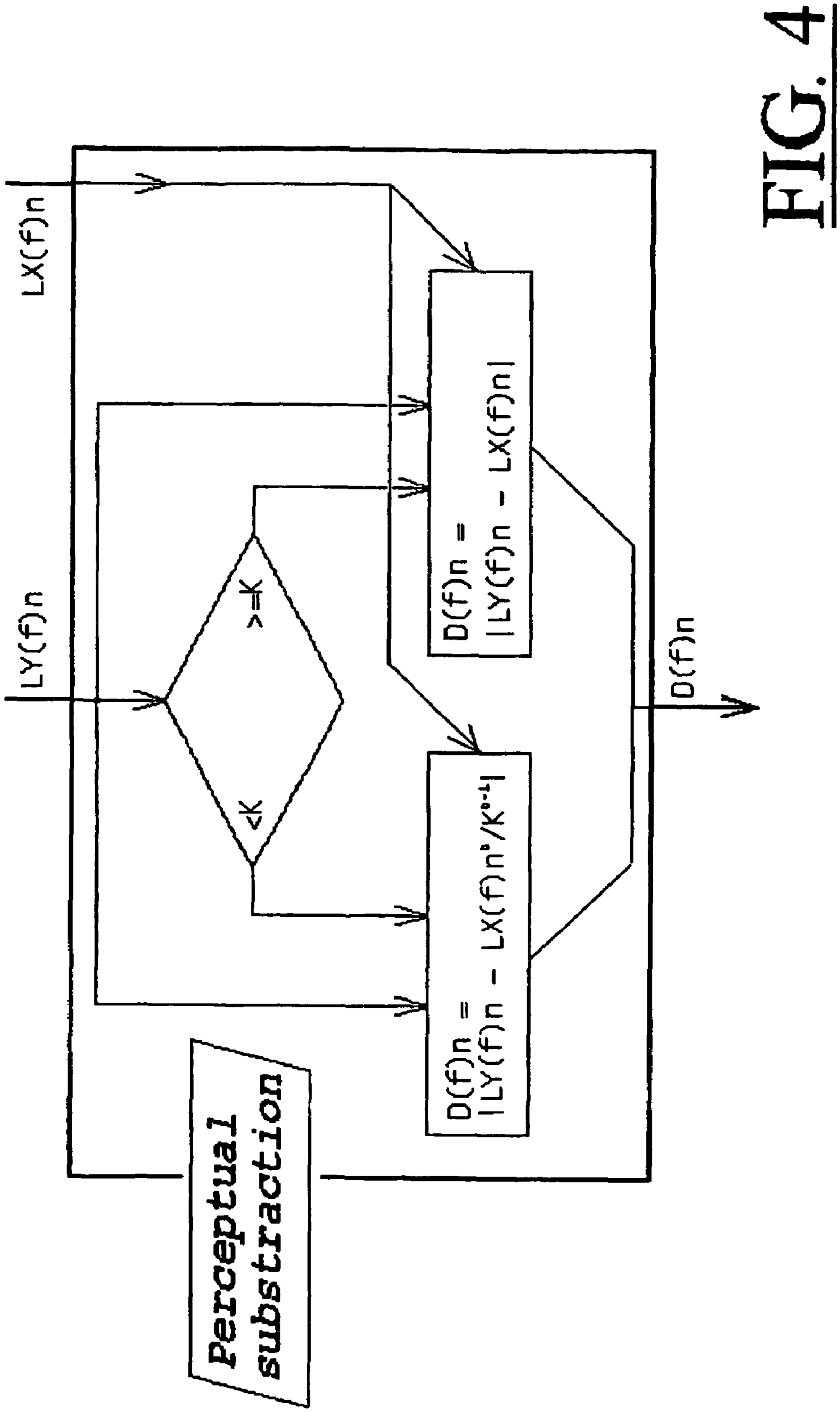
FIG. 4 shows the second new module of the PESQ system.

In the second soft-scale processing, controlled by a second sub-algorithm, advanced scaling is applied on low level parts of the input signal. When the input signal (reference signal) contains low levels of noise, a transparent speech transport system will give an output speech signal that also contains low levels of noise. The output of the speech transport system is then judged of having lower quality than expected on the basis of the noise introduced by the transport system. One would only be aware of the fact that the noise is not caused by the transport system if one could listen to the input speech signal and make a comparison. However in most subjective speech quality tests the input reference is not presented to the testing subject and consequently the subject judges low noise level differences in the input signal as differences in quality of the speech transport system. In order to have high correlations, in objective test systems, with such subjective tests, this effect has to be emulated in an advanced objective speech quality assessment algorithm. The embodiment of the preferred option of the invention, illustrated in FIG. 4, emulates this by creating an artificial reference speech signal in the power representation domain for which the noise power levels are lowered by a scaling factor that depends on the local level of the noise in the input signal. Thus the artificial reference signal converges to zero faster than the original input signal for low levels of this input signal. When the disturbances in the degraded output signal are calculated during low level signal parts, as present in the reference input signal, the difference calculation in the internal representation loudness domain is carried out after scaling of the input loudness signal to a level that goes to zero faster than the loudness of the input signal as it approaches zero.

The difference in internal representation in the time-frequency plane is set to $D(f)_n=|LY(f)_n-LX(f)_n{}^b/K^{b-1}|$ for $LX(f)_n<K$ or $D(f)_n=|LY(f)_n-LX(f)_n|$ for $LX(f)_n\geqq K$.

In these formula is $b>1$ while K represents the low level noise power criterion per time frequency cell.

As an alternative the second soft-scale processing sub-algorithm can also be implemented by replacing the $LX(f)_n<K$ criterion by a power criterion in a single time frame. In this alternative option the difference in internal representation in the time-frequency plane is set to $D(f)_n=|LY(f)_n-LX(f)_n{}^b/K^{b-1}|$ for $LX(t)<K'$ or $D(f)_n=|LY(f)_n-LX(f)_n|$ for $LX(t)\geqq K'$.

In these alternative formula is $b>1$ while K' represents the low level noise power criterion per time frame.

REFERENCES INCORPORATED HEREIN BY REFERENCES

[1] BEERENDS (J. G.), STEMERDINK (J. A.): A Perceptual Speech-Quality Measure Based on a Psychoacoustic Sound Representation, *J. Audio Eng. Soc.*, Vol. 42, No. 3, pp. 115-123, March 1994.

[2] BEERENDS (J. G.): Modelling Cognitive Effects that Play a Role in the Perception of Speech Quality, *Speech Quality Assessment*, Workshop papers, Bochum, pp. 1-9, November 1994.

[3] BEERENDS (J. G.): Measuring the quality of speech and music codecs, an integrated psychoacoustic approach, 98th AES Convention, pre-print No. 3945, 1995.

[4] HOLLIER (M. P.), HAWKSFORD (M. O.), GUARD (D. R.): Error activity and error entropy as a measure of psychoacoustic significance in the perceptual domain, IEE Proceedings—Vision, Image and Signal Processing, 141 (3), 203-208, June 1994.

[5] RIX (A. W.), REYNOLDS (R.), HOLLIER (M. P.): Perceptual measurement of end-to-end speech quality over audio and packet-based networks, 106th AES Convention, pre-print No. 4873, May 1999.

[6] HOLLIER (M. P.), HAWKSFORD (M. O.), GUARD (D. R.), Characterisation of communications systems using a speech-like test stimulus, Journal of the AES, 41 (12), 1008-1021, December 1993.

[7] ZWICKER (Feldtkeller): *Das Ohr als Nachrichtenempfanger*, S. Hirzel Verlag, Stuttgart, 1967.

[8] Draft ITU-T recommendation P.862, "Telephone transmission quality, telephone installations, local line networks—Methods for objective and subjective assessment of quality—Perceptual evaluation of speech quality (PESQ), an objective method for end-to-end speech quality assessment of narrow-bank telephone networks and speech codecs", ITU-T 02.2001

[9] European patent application EP01200945, Koninklijke KPN n.v.

The invention claimed is:

1. A method for use in a system that measures, through use of a psychoacoustic model of human perception, transmission quality of an output speech signal (Y) produced by an audio system, the audio system having an input speech signal (X) applied thereto and responsively producing the output speech signal, the output speech signal being a degraded version of the input speech signal, both the input speech signal and the output speech signal being applied as input to the measurement system and a quality signal being produced as output there from, the method comprising the steps, performed in the measurement system, of:

a) determining both a local compensation ratio (F) indicative of a ratio of power of the input speech signal (X) to power of the output speech signal (Y) and, in response to the local compensation ratio, a variable scale factor (S), wherein the determining step comprises the steps of:

(a1) calculating the local compensation ratio (F) from power representations PX and PY of the time-frequency representations of the input speech signal (X) and the output signal (Y) respectively, and where F equals a ratio PX/PY;

(a2) calculating a clipped ratio C where C is set equal to a first pre-defined clipping value mm for F<mm, a second pre-defined clipping value MM for F>MM, or, for all other values, F; and (a3) calculating the scaling ratio (S) from a first scaling factor m and a second scaling factor M, where both m and M are pre-defined values with $mm<m\leqq 1$ and $MM>M\geqq 1$, S equals either $C^a+C-C(m)^{a-1}$ for C<m, or $C^a+C-C(M)^{a-1}$ for either C>M or S=C, and 'a' is a first tuning parameter with a predefined value between zero and one;

(b) generating, in response to the scale factor and predefined time-frequency representations, in accordance with the model, of the input speech signal and the output speech signal, first and second signals such that relatively small deviations in power between the input speech signal and the output speech signal are compensated in the first and second signals while relatively large deviations in the power between the input speech signal and the output speech signal are only partially compensated in the first and second signals, wherein the generating step comprises one of the steps of:

(b1) scaling, in response to the scale factor (S), the representations of both the input speech signal (X) and the output signal (Y) to yield a compensated input speech signal representation and a compensated output signal representation as the first and second signals, respectively; or (b2) scaling, in response to the scale factor (S), the representation of the input speech signal (X) to yield a compensated input speech signal representation such that the first signal is the compensated input speech signal representation and the second signal is the output signal representation; or (b3) scaling, in response to the scale factor (S), the representation of the output signal (Y) to yield a compensated output signal representation such that the second signal is the compensated output signal representation and the first signal is the input speech signal representation;

(c) comparing the first and second signals to yield a difference there between;

(d) ascertaining, in response to the difference, the transmission quality; and (e) producing, in response to the transmission quality, the quality signal.

2. The method recited in claim 1 further comprising the step of creating an artificial reference speech signal for which noise levels present in the input speech signal (X) are reduced by a scaling factor which depends on local level of the noise in the input speech signal.

3. The method recited in claim 2 wherein the comparing step comprises the step of:

setting a difference $D(f)_n$ in loudness representations $LX(f)_n$ and $LY(f)_n$ of the input speech signal (X) and the output signal (Y), respectively, in a time-frequency plane equal to $|LY(f)_n-LX(f)_n{}^b/K^{b-1}|$ for $LX(f)_n<K$, or $|LY(f)_n-LX(f)_n|$ for $LX(f)_n\geqq K$, where b is a second tuning parameter with a predefined value greater than one and K is a low level noise power criterion value representing a desired low-level noise power criterion per time-frequency cell, where $LX(f)_n$ and $LY(f)_n$ are calculated according to the following equations:

$$LX(f)_n = S\left(\frac{P_0(f)}{0.5}\right)^{\gamma}\left[\left(0.5+0.5\frac{PX(f)_n}{P_o(f)}\right)^{\gamma}-1\right]$$

$$LY(f)_n = S\left(\frac{P_0(f)}{0.5}\right)^{\gamma}\left[\left(0.5+0.5\frac{PY(f)_n}{P_o(f)}\right)^{\gamma}-1\right]$$

where: $P_0(f)$ is an absolute threshold;

S is the scale factor; and $\gamma$ is 0.23 for loudness above 4 Bark and, for loudness less than 4 Bark, is a predefined value higher than 0.23.

4. The method recited in claim 2 wherein the comparing step comprises the step of:

setting a difference $D(f)_n$ in loudness representations $LX(f)_n$ and $LY(f)_n$ of the input speech signal (X) and the output signal (Y), respectively, in a time-frequency plane equal to $|LY(f)_n-LX(f)_n{}^b/K^{b-1}|$ for LX(t)<K', or $|LY(f)_n-LX(f)_n|$ for $LX(t)\geqq K'$, where b is a second tuning parameter with a predefined value greater than one and K' is a low level noise power criterion value representing a desired low-level noise power criterion per time frame, where $LX(f)_n$ and $LY(f)_n$ are calculated according to the following equations:

$$LX(f)_n = S\left(\frac{P_0(f)}{0.5}\right)^{\gamma}\left[\left(0.5+0.5\frac{PX(f)_n}{P_o(f)}\right)^{\gamma}-1\right]$$

$$LY(f)_n = S\left(\frac{P_0(f)}{0.5}\right)^{\gamma}\left[\left(0.5+0.5\frac{PY(f)_n}{P_o(f)}\right)^{\gamma}-1\right]$$

where: $P_0(f)$ is an absolute threshold;

S is the scale factor; and $\gamma$ is 0.23 for loudness above 4 Bark and, for loudness less than 4 Bark, is a predefined value higher than 0.23.

5. Apparatus for measuring, through use of a psychoacoustic model of human perception, transmission quality of an output speech signal (Y) produced by an audio system, the audio system having an input speech signal (X) applied thereto and responsively producing the output speech signal, the output speech signal being a degraded version of the input speech signal, both the input speech signal and the output speech signal being applied as input to the measurement system and a quality signal being produced as output there from, the apparatus comprising:

(a) means for determining both a local compensation ratio (F) indicative of a ratio of power of the input speech signal (X) to power of the output speech signal (Y) and, in response to the local compensation ratio, a variable scale factor (S), wherein the determining means comprises:

(a1) means for calculating the local compensation ratio (F) from power representations PX and PY of the time-frequency representations of the input speech signal (X) and the output signal (Y), respectively, and where F equals a ratio PX/PY;

(a2) means for calculating a clipped ratio C where C is set equal to a first pre-defined clipping value mm for F<mm, a second pre-defined clipping value MM for F>MM, or, for all other values, F; and (a3) means for calculating the scaling ratio (S) from a first scaling factor m and a second scaling factor M, where both m and M are pre-defined values with mm<m≦1 and MM>M≧1, S equals either $C^a+C-C(m)^{a-1}$ for C<m, or $C^a+C-C(M)^{a-1}$ for either C>M or S=C, and 'a' is a first tuning parameter with a predefined value between zero and one;

(b) means for generating, in response to the scale factor and predefined time-frequency representations, in accordance with the model, of the input speech signal and the output speech signal, first and second signals such that relatively small deviations in power between the input speech signal and the output speech signal are compensated in the first and second signals while relatively large deviations in the power between the input speech signal and the output speech signal are only partially compensated in the first and second signals, wherein the generating means comprises:

(b1) means for scaling, in response to the scale factor (S), the representations of both the input speech signal (X) and the output signal (Y) to yield a compensated input speech signal representation and a compensated output signal representation as the first and second signals, respectively; or (b2) means for scaling, in response to the scale factor (S), the representation of the input speech signal (X) to yield a compensated input speech signal representation such that the first signal is the compensated input speech signal representation and the second signal is the output signal representation; or (b3) means for scaling, in response to the scale factor (S), the representation of the output signal (Y) to yield a compensated output signal representation such that the second signal is the compensated output signal representation and the first signal is the input speech signal representation;

(c) means for comparing the first and second signals to yield a difference there between; and (d) means for ascertaining, in response to the difference, the transmission quality and for producing, in response to the transmission quality, the quality signal.

6. The apparatus recited in claim 5 further comprising means for creating an artificial reference speech signal for which noise levels present in the input speech signal (X) are reduced by a scaling factor which depends on local level of the noise in the input speech signal.

7. The apparatus recited in claim 6 wherein the comparing means comprises:

means for setting a difference $D(f)_n$ in loudness representations $LX(f)_n$ and $LY(f)_n$ of the input speech signal (X) and the output signal (Y), respectively, in a time-frequency plane equal to $|LY(f)_n - LX(f)_n{}^b/K^{b-1}|$ for $LX(f)_n<K$, or $|LY(f)_n - LX(f)_n|$ for $LX(f)_n \geqq K$, where b is a second tuning parameter with a predefined value greater than one and K is a low level noise power criterion value representing a desired low-level noise power criterion per time-frequency cell, where $LX(f)_n$ and $LY(f)_n$ are calculated according to the following equations:

$$LX(f)_n = S\left(\frac{P_0(f)}{0.5}\right)^\gamma\left[\left(0.5 + 0.5\frac{PX(f)_n}{P_o(f)}\right)^\gamma - 1\right]$$

$$LY(f)_n = S\left(\frac{P_0(f)}{0.5}\right)^\gamma\left[\left(0.5 + 0.5\frac{PY(f)_n}{P_o(f)}\right)^\gamma - 1\right]$$

where: $P_0(f)$ is an absolute threshold;

S is the scale factor; and

γ is 0.23 for loudness above 4 Bark and, for loudness less than 4 Bark, is a predefined value higher than 0.23.

8. The apparatus recited in claim 6 wherein the comparing means comprises:

means for setting a difference $D(f)_n$ in loudness representations $LX(f)_n$ and $LY(f)_n$ of the input speech signal (X) and the output signal (Y), respectively, in a time-frequency plane equal to $|LY(f)_n - LX(f)_n{}^b/K^{b-1}|$ for $LX(t)<K'$, or $|LY(f)_n - LX(f)_n|$ for $LX(t) \geqq K'$, where b is a second tuning parameter with a predefined value greater than one and K' is a low level noise power criterion value representing a desired low-level noise power criterion per time frame, where $LX(f)_n$ and $LY(f)_n$ are calculated according to the following equations:

$$LX(f)_n = S\left(\frac{P_0(f)}{0.5}\right)^\gamma\left[\left(0.5 + 0.5\frac{PX(f)_n}{P_o(f)}\right)^\gamma - 1\right]$$

$$LY(f)_n = S\left(\frac{P_0(f)}{0.5}\right)^\gamma\left[\left(0.5 + 0.5\frac{PY(f)_n}{P_o(f)}\right)^\gamma - 1\right]$$

where: $P_0(f)$ is an absolute threshold;

S is the scale factor; and

γ is 0.23 for loudness above 4 Bark and, for loudness less than 4 Bark, is a predefined value higher than 0.23.

* * * * *